United States Patent Office 2,785,149
Patented Mar. 12, 1957

2,785,149

AMINOTRIAZINE REACTION PRODUCTS

Henry P. Wohnsiedler, Darien, Conn., assignor to American Cyanamid Company, New York, N. Y., a corporation of Maine No Drawing. Application July 19, 1954,
Serial No. 444,360

9 Claims. (Cl. 260—67.6)

This invention relates to the production of new synthetic materials which are particularly useful in the plastics, coating, laminating, adhesive, molding, textile-treating, paper-treating, paper-additive and other arts. More particularly the invention is concerned with new, aldehyde-reactable, aminotriazine reaction products and with the aldehyde-reaction products thereof.

The aldehyde-reactable aminotriazine reaction products of this invention are reaction products of ingredients comprising (1) a 1,3,5-triazine (symmetrical triazine) containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals (e. g., melamine, N-phenylmelamine, formoguanamine, ammeline, etc.), (2) a halohydrin (e. g., ethylene chlorohydrin, ethylene bromohydrin, propylene chlorohydrin, etc.), and (3) a monalkanol amine (e. g., monoethanol amine, monopropanol amine, etc.). The ingredients of (1) and (3) are employed in a molar ratio of from 0.5 to 3 moles (more particularly from 1 to 2 or 3 moles) of the latter per mole of the former, and the halohydrin of (2) is employed in a molar ratio at least equal to that of the monoalkanol amine of (3), more particularly from 1 to 2 moles of the halohydrin for each mole of the monoalkanol amine. A cationic aminoplast is obtained by reacting ingredients comprising (1) an aldehyde, including polymeric aldehydes, hydroxy-aldehydes and aldehyde-addition products, e. g., formaldehyde, paraformaldehyde, glycolic aldehyde, dimethylol urea, etc., and (2) an aldehyde-reactable aminotriazine produced by interreaction of the aforementioned 1,3,5-aminotriazine, halohydrin and monoalkanol amine. This cationic aminoplast is substantive toward various natural and synthetic fibers, e. g., natural cellulosic fibers and fibers of regenerated cellulose, including the various rayons, wool, silk and other proteinaceous fibers, and hence is particularly useful as a textile-treating composition, a paper-treating composition, a beater additive in the production of paper, or as a component of such compositions.

Cationic aminoplasts of various kinds were known prior to my invention. See, for instance, Wohnsiedler and Thomas U. S. Patents 2,345,543 and 2,356,718, which are directed to colloidal aqueous solutions of certain partially polymerized, positively charge aminotriazine-formaldehyde condensation products; and West U. S. Patent No. 2,433,802, which discloses and claims quaternary ammonium and quaternary pyridinium salts of an uncured melamine-formaldehyde condensation product. The cationic aminoplasts of this invention differ in their chemical constitution from those previously known in the art, and their properties also are different, e. g., their solubility characteristics, stability on storage, substantivity toward materials to which they are applied, etc. They are made from relatively inexpensive raw materials without processing difficulties, and find utility in applications where the current cationic aminotriazine-aldehyde condensation products and solutions thereof would be entirely unsuited. The advantages of the invention will, therefore, be readily apparent to those skilled in the art.

The following examples are given by way of illustration and not by way of limitation so that those skilled in the art may better understand how the present invention can be carried into effect. All parts and percentages are by weight.

Example 1

A

|  | Parts | Approx. Molar Ratio |
|---|---|---|
| Melamine | 252 | 1 |
| Ethylene chlorohydrin | 320 | 2 |
| Monoethanol amine | 122 | 1 |

The melamine and ethylene chlorohydrin are heated together with stirring in a reaction vessel placed in an oil bath, being brought to 120° C. in 10 minutes. Dropwise addition of the monoethanol amine is then started, the total amount being added over a period of 15 minutes while the temperature is rising to 135° C. Heating is continued for an additional 55 minutes to a temperature of 160° C., by which time the initially creamy suspension has assumed a quite thick, pasty consistency. The reaction product is discharged from the vessel, cooled, extracted with alcohol and then filtered on a Büchner funnel. The wet mass is passed through a 1/16" mesh screen, alll coarse material being ground to insure effective extraction. After drying at 65° C., the dried product amounts to 497 parts. Analysis shows 33.2% total nitrogen, 17.2% chlorine as chloride and 0.57% nitrogen as ammonium salt. The product is not a pure compound but is probably a mixture comprising compounds represented by the following formulas:

I
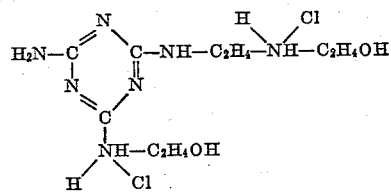

Theoretical total nitrogen=29.7%. Theoretical chlorine=21.5%

II
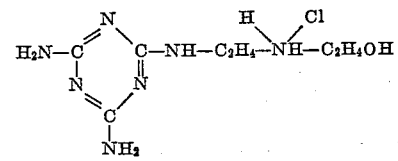

Theoretical total nitrogen=39.2%. Theoretical chlorine=14.2%

III
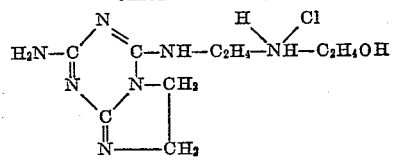

Theoretical total nitrogen=35.5%.
Theoretical chlorine=12.9%.

B

|  | Parts |
|---|---|
| Reaction product of "A" | 15.0 |
| Aqueous formaldehyde (approx. 37.1% HCHO) | 14.5 |
| Water | 26.0 |

In this reaction, the product of "A" is assumed to have the average composition corresponding to that of the compound represented by Formula II; and, for each mole of the same, three moles of formaldehyde are taken. The mixture is heated to 70° C. over a period of several minutes, yielding a cationic solution of the formaldehyde-reaction product which is clear when cool, hydrophilic and having a pH of 3.1. The pH can be increased to about 4.5 by the addition of, for example, sodium hydroxide without causing precipitation of resinous solids. A portion of the solution is cast in the form of films, which are dried at 65° C. and then baked at 105°–120° C. for 1 hour. The baked films are hard, clear and are unaffected by contact with water. When the initial resin solution obtained by heating to 70° C. is caused to react further by heating at 90° C., it gels and is then insoluble in water.

*Example 2*

|  | Parts | Approx. Molar Ratio |
| --- | --- | --- |
| Melamine | 126 | 1 |
| Ethylene chlorohydrin | 240 | 3 |
| Monoethanol amine | 183 | 3 |

The melamine and ethylene chlorohydrin are heated together with stirring as in Example 1, being brought to 120° C. in 15 minutes. The dropwise addition of the monoethanol amine is started, the total amount being added over a period of 10 minutes while the temperature is rising to 180° C. The reaction mass has a yellow-tan color at this stage, and is clearer than before starting the addition of the amine. Heating at 180° C. is continued for an additional 65 minutes. The reaction product is slightly soluble in cold water but dissolves completely in hot water. It is also readily soluble in ethanol.

The reaction product is mixed with 600 parts of water and the mixture is heated to boiling, after which it is cooled to room temperature and filtered. The residue, after washing with cold water, is dried at 65° C. A potentially resinous, cationic, formaldehyde-reaction product of this residue is prepared by mixing together 75 parts of the residue, 145 parts of aqueous formaldehyde (approx. 37.1% HCHO) and 250 parts of water, and heating the mixture under reflux at the boiling temperature of the mass for about 5 minutes. A viscous formaldehyde-reaction product is obtained, which can be resinified by removal of the water.

*Example 3*

|  | Parts | Approx. Molar Ratio |
| --- | --- | --- |
| Melamine | 189.0 | 1 |
| Ethylene chlorohydrin | 120.0 | 1 |
| Monoethanol amine | 91.5 | 1 |

The melamine and ethylene chlorohydrin are heated together with stirring as in Example 1, being brought to 120° C. in 15 minutes. The dropwise addition of the monoethanol amine is started, the total amount being added over a period of 5 minutes while the temperature is rising to 140° C. Heating is continued for an additional 2 hours to a temperature of 165° C. The reaction mass is then cooled, and one liter of water is added thereto. After standing for about 64 hours the mixture is heated to 100° C. and filtered through a steam-heated funnel. The residue, after being dried at 65° C., weighs 168 parts. The filtrate is chilled, and the solid matter which precipitates is filtered off and washed with cold water. This latter residue, after being dried at 65° C., weighs 22 parts. Both residues are mixed together to form a homogeneous mixture. One hundred (100) parts of the blend, 145 parts of aqueous formaldehyde (approx. 37.1% HCHO) and 260 parts of water are heated together to 75° C., and held at this temperature for several minutes. A hydrophilic solution of a cationic reaction product of formaldehyde with the melamine-ethylene chlorohydrin-monoethanol amine reaction product of this example is obtained. It can be concentrated and used as a textile-treating agent, paper-treating agent, beater additive for use in making paper, alone or admixed with other agents conventionally employed in such compositions.

*Example 4*

Example 1 is repeated with the exception that, in addition to the melamine, ethylene chlorohydrin and monoethanol amine, there also is added to the reaction vessel 244 parts of monobutyl ether of ethylene glycol as a diluent in which the reaction is effected. The reaction is continued at the reflux temperature (153°–157° C.) of the reaction mass for about 85 minutes after all of the monoethanol amine has been added, and part of the diluent is removed by vacuum distillation while the temperature is raised to 166° C. over an additional 25-minute period. The residue is solid when cold. After heating to 165° C. and decanting the excess liquid diluent, the product is a soft, gummy material. It is mulled in a mortar with 1500 parts of alcohol and passed through a 20-mesh screen onto a Büchner funnel. After filtering and washing with alcohol, the cake is dried at 65° C. The product is obtained in a yield corresponding to 72.3% of the theoretical.

Similar results are obtained when o-dichlorobenzene is substituted for monobutyl ether of ethylene glycol as a diluent or inert medium in which the reaction is effected.

Resinous or potentially resinous materials are obtained by reaction of the melamine-ethylene chlorohydrin-monoethanol amine reaction product with an aldehyde, e. g., formaldehyde, acetaldehyde, butyraldehyde, acrolein, methacrolein, paraformaldehyde, etc., under neutral, alkaline or acid conditions, and in molar ratios of, for example, from about 1 to 4 moles of the latter per mole of the former and at temperatures ranging from about 30° or 40° C. up to the reflux temperature of the reaction mass at atmospheric pressure.

*Example 5*

Example 1 is repeated with the exception that 378 parts of propylene chlorohydrin (1-chloro-2-propanol) is used instead of 320 parts of ethylene chlorohydrin. Similar results are obtained.

*Example 6*

Example 1 is repeated with the exception that 500 parts of ethylene bromohydrin is employed in place of 320 parts of ethylene chlorohydrin. Similar results are obtained.

*Example 7*

Same as in Example 1 with the exception that 150 parts of monopropanol amine is used instead of 122 parts of monoethanol amine. Similar results are obtained.

*Example 8*

|  | Parts | Approx. Molar Ratio |
| --- | --- | --- |
| N-phenylmelamine | 202 | 1 |
| Ethylene chlorohydrin | 160 | 2 |
| Monoethanol amine | 61 | 1 |

The N-phenylmelamine and ethylene chlorohydrin are heated together with stirring in a reaction vessel placed in an oil bath, being brought to 120° C. in 11 minutes. Dropwise addition of the monoethanol amine is then started, the total amount being added over a period of 6 minutes while the temperature is rising to 153° C.

Heating is continued for an additional 23 minutes while the temperature is rising to 160° C. The solution is clear and purple in color four minutes after all of the monoethanol amine has been added. Two minutes later refluxing ends, indicating that all of the ethylene chlorohydrin has reacted.

At the end of the reaction period, a cooled sample of the reaction product is a clear, purple-colored, sticky resin which is soluble in hot alcohol. A crystalline precipitate is formed on cooling the alcohol solution of the product. The reaction product also is soluble in hot water, the aqueous solution becoming hazy on cooling. The hazy solution becomes clear when acidified with an acid, specifically sulfuric acid.

The reaction product is discharged from the vessel, cooled to 85° C., and extracted with alcohol, keeping the temperature at 80°-85° C. The resulting material is cooled to 5° C. and filtered. The cake is dried at 65° C., yielding 60 parts of dried product. The filtrate is mixed with an equal volume of water and 160 parts of 50% aqueous sodium hydroxide is added. A resinous phase precipitates upon cooling this mixture. Chloroform is added to the extent of one-half the volume of the mixture. After equilibrating for solubility, the chloroform layer is separated, yielding a purple-colored, resinous solid upon evaporation on a steam bath. After drying this solid in a vacuum desiccator over $P_2O_5$, the yield thereof is 195 parts.

Addition of the sodium hydroxide to the filtrate as described above precipitates a product comprising, it is believed the free base represented by the formula

IV

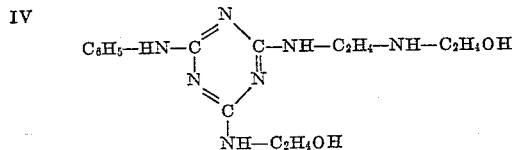

This product as such, or in the form of an acid (e. g., hydrochloric acid) salt thereof, is reactable with an aldehyde, specifically formaldehyde, through the —NH— groups thereof to yield a thermoplastic resinous material which may be used as a modifier, specifically in plasticizer, of other synthetic resins such, for instance, as amidogen textile-finishing or paper-treating resins, in order to obtain special properties of "hand" or flexibility.

A composition suitable for this purpose is obtained by reacting 15 parts of the alkali-precipitated product, 29.2 parts of 37% aqueous formaldehyde solution and 21 parts of water at 75° C. for 6 minutes. The proportions of reactants in this case approximate 1 mole of the aminotriazine reactant and 8 moles of formaldehyde.

*Example 9*

A

|  | Parts | Approx. Molar Ratio |
|---|---|---|
| Benzoguanamine | 187 | 1 |
| Ethylene chlorohydrin | 160 | 2 |
| Monoethanol amine | 61 | 1 |

The benzoguanamine and ethylene chlorohydrin are heated together with stirring in a reaction vessel placed in an oil bath, being brought to 120° C. in 18 minutes. Dropwise addition of the monoethanol amine is then started, the total amount being added over a period of 6 minutes while the temperature is rising to 146° C. The reaction mass at this stage is a thick paste. The temperature is raised to 150° C. within 6 minutes, and the reaction mass becomes much clearer and begins to thin. Heating is continued for 53 minutes. Refluxing stops after heating has been continued for 31 minutes and the temperature has risen to 172° C. The maximum temperature is 187° C., and the reaction product is then a clear, brown liquid. A sample of this product, when cool, is a clear, tan-colored, sticky resin. It is soluble in hot ethanol, hot water and hot ethylene glycol monomethyl ether, yielding crystalline precipitates on cooling the ethanol and ethylene glycol monomethyl ether solutions.

The reaction product is cooled to 100° C., 500 parts of water is added, keeping the temperature at 98°-100° C. The solution is then filtered hot, chilled and filtered through a Büchner funnel. The filter cake is washed with 150 parts of water in two parts, and dried at 65° C. The yield amounts to 206 parts.

B

|  | Parts | Approx. Molar Ratio |
|---|---|---|
| Reaction product of "A" | 16.8 | 1 |
| Paraformaldehyde | 1.5 | 3 |
| Ethanol | 55.0 |  |

The foregoing ingredients are mixed and heated together at 80° C. for 1½ hours, yielding a resin solution of the paraformaldehyde with the reaction product of "A." It is suitable for use as a textile-treating composition, paper-treating composition, as a beater additive in the production of paper, as an impregnating composition, and for various other purposes.

*Example 10*

Example 9 is repeated with the exception that 221 parts of glycerol alpha-chlorohydrin is employed instead of 160 parts of ethylene chlorohydrin. Similar results are obtained.

*Example 11*

Example 9 is repeated with the exception that 89 parts of monobutanol amine (2-amino-1-butanol) is used in place of 61 parts of monoethanol amine. Similar results are obtained.

*Example 12*

The triazine derivative of Example 1A is reacted in the following manner to provide a resin solution suitable for paper application.

| | Parts |
|---|---|
| Reaction product of 1A | 15.0 |
| Aqueous formaldehyde (approx. 37% HCHO) | 26.6 |
| Water (to provide 20% solids concentration) | 82.4 |

The above ingredients are heated together to 70° C., where solution occurs. On cooling, the solution remains clear. It is diluted with water to 10% solids concentration, and in this form is added to refined sulfite cellulose in an experimental paper beater, using an amount of the resin solution such as to provide 3% of resin solids, based on the dry weight of the cellulose. After the treated stock has been formed into paper sheets and the latter dried in the usual manner, the average wet tensile strength thereof is found to be 5.4 lbs. per inch or 20% of the dry strength. Untreated paper sheets have a wet tensile strength of less than 0.5 lb. per inch.

It will be understood, of course, by those skilled in the art that my invention is not limited to the specific reactants nor to the specific conditions of reaction shown in the above illustrative examples. Thus, the temperatures of the reaction at which the aldehyde-reactable aminotriazine reactant and the aldehyde-reaction product thereof are formed can be varied over a wide range, as desired or as conditions may require. Advantageously the aldehyde-reactable aminotriazine reactant is prepared by heating the required reactants in the manner illustrated in the foregoing examples, but higher or lower temperatures may be employed. Thus, one can use temperatures as low as, for instance, 100° or 110° C. up to, for example, 225°–240° C., depending upon the particular reactants employed and other influencing factors. The aldehyde-reaction products may be produced by co-reaction at temperatures ranging, for instance, from room temperature (20°–30° C.) up to the fusion or boiling temperature of the mixed reactants.

Illustrative examples of alkanol amines (monoalkanol amines) that can be used in producing the aldehyde-reactable aminotriazines of this invention, and which can be employed in lieu of all or part of the particular monoalkanol amine used in the individual example, are:

Isopropanol amine (monoisopropanol amine)
Normal and isomeric monobutanol amines
2-amino-3-hexanol
3-amino-4-heptanol
2-amino-4-pentanol
5-amino-4-octanol
3-amino-3-methyl-2-butanol
2-amino-2-methyl-3-hexanol
2-amino-2-methyl-1-butanol
3-amino-3-methyl-4-heptanol
3-amino-2-methyl-4-heptanol In other words, the monoalkanol amines used in preparing the aldehyde-reactable aminotriazines of this invention may be represented by the general formula

IV          $H_2N—R—OH$ where R represents a divalent, straight or branched-chain, saturated aliphatic hydrocarbon radical, e. g., such a hydrocarbon radical containing from 2 to 18 carbon atoms, inclusive, and advantageously from 2 to about 6 or 8 carbon atoms.

Illustrative examples of halohydrins (monochloro-, monobromo-, monoiodo- and monofluorohydrins) that can be employed in preparing the aldehyde-reactable aminotriazines of this invention, and which can be used in lieu of all or part of the particular halohydrin employed in the individual example, are 3-chloro-1-propanol (trimethylene chlorohydrin)
3-bromo-1-propanol
1-chloro-2-methylpropanol
Ethylene fluorohydrin
2-chloro-4-pentanol
2-bromo-4-pentanol
2-chloro-3-hexanol
2-bromo-3-hexanol
3-chloro-4-heptanol
3-bromo-4-heptanol
5-chloro-4-octanol
5-bromo-4-octanol
3-chloro-3-methyl-2-butanol
2-chloro-2-methyl-1-butanol
3-chloro-2-methyl-1-pentanol
2-chloro-2-methyl-3-hexanol
3-chloro-3-methyl-4-heptanol
3-chloro-2-methyl-4-heptanol
Glycerol alpha-bromohydrin (3-bromo-1,2-propanediol)
2-chloro-1,3-propanediol
2-chloro-2-methylol-1-butanol  (2-ethyl-2-chloro-1,3-propanediol)
3-bromo-1,2-butanediol
3-chloro-1,3-butanediol
2-chloro-1,4-pentanediol
3-bromo-1,5-pentanediol The use of available iodohalohydrins, for instance those corresponding to the above chloro-, bromo- and fluorohydrins is not precluded, but have the disadvantage that they impart color to the resulting aminotriazine.

Illustrative examples of aminotriazine starting reactants that can be employed (that is, 1,3,5-triazines having attached to one carbon atom of the triazine nucleus a grouping which contains an —NH₂ radical and having attached to another carbon atom of the triazine nucleus a grouping which contains an —NHR radical) are those represented by the formula V 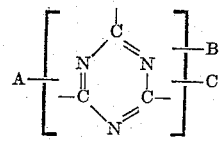

where A represents a grouping which contains an —NH₂ radical, e. g., —NH₂ itself, —CONH₂ (carbamyl), thiocarbamyl (—CSNH₂), —NHCONH₂ (ureido), —NHCSNH₂ (thioureido), —NHNHCONH₂ (semicarbazido), —NHNHCSNH₂ (thiosemicarbazido), —NHNH₂ (hydrazino), etc.; B represents a grouping which contains an —NHR radical, where R represents hydrogen or a monovalent hydrocarbon radical; and C represents hydrogen, hydroxy, halogen (e. g., chlorine, bromine, etc.), any organic (carbon-containing) substituent including cyano, hydrocarbon, and hydroxyhydrocarbon radicals, or any of the groupings represented by A and B.

Illustrative examples of monovalent hydrocarbon radicals represented by R in the aforementioned —NHR radical, and which C also may represent, are: aliphatic (e. g, methyl, ethyl, propyl, isopropyl, butyl, isobutyl, sec.-butyl, butenyl, amyl, isoamyl, hexyl, octyl decyl dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, tolylethyl, phenylpropyl, etc.).

Illustrative examples of hydroxyhydrocarbon radicals which C in Formula V may represent are hydroxyhydrocarbon radicals corresponding to those hydrocarbon radicals just named by way of illustration with respect to R in the aforementioned —NHR radical, e. g., hydroxyethyl, hydroxypropyl, hydroxyisopropyl, dihydroxypropyl, hydroxybutyl, etc.

Illustrative examples of groupings represented by B in Formula V are —NHR itself, —CONHR, —SCNHR, —NHCONHR, —NHCSNHR, —NHNHCONHR, —NHNHCSNHR, —NHNHR, etc., where R has the same meaning as given above.

One can use an aminotriazine represented by Formula V in lieu of all or part of the aminotriazine starting reactant employed in the individual examples.

In producing the reaction product of an aldehyde with the aldehyde-reactable aminotriazine, the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that can be employed, e. g., an equivalent amount thereof in place of formaldehyde in the foregoing examples, are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycolic aldehyde, glyceraldehyde, etc.), mixtures thereof, or mixtures of formaldehyde (or compounds engendering formaldehyde) with such aldehydes.

The ratio of the aldehydic reactant to the aldehyde-reactable aminotriazine can be varied over a wide range depending, for example, upon the number of aldehyde-reactable amino groups in the aminotriazine and upon the particular properties desired in the finished product. The aldehyde, e. g., formaldehyde, is used in an amount sufficient to react with from one to all of the reactive amino groups in the aminotriazine. Thus, one can use, for instance, from 1 to 6 moles (or more if desired), preferably from 1 to 2 or 3 moles, of the aldehyde per mole of the aminotriazine.

The initial condensation reaction between the aldehyde specifically formaldehyde, and the aldehyde-reactable aminotriazine, may be carried out at normal or at elevated temperatures, at atmospheric, subatmospheric or superatmospheric pressures, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di- or triamine, aqueous ammonia, etc. Illustrative examples of acid condensation catalysts that may be employed are inorganic and organic acids, e. g., hydrochloric, sulfuric, phosphoric, acetic, lactic, acrylic, phthalic, maleic, etc., or acid salts such as sodium acid sulfate, monosodium phosphate, monosodium phthalate, etc. Mixtures of acids, of acid salts or of acids and acid salts may be employed if desired.

The reaction between the aldehyde, e. g., formaldehyde, and the aldehyde-reactable aminotriazine may be carried out in the presence of solvents or diluents, other natural or synthetic bodies (numerous examples of which hereafter are given), or while admixed with other materials which are reactable or non-reactable with the aldehydic reactant or with the triazine derivative, e. g., urea, thiourea, cyanamide, dicyandiamide, succinamide, phthalic diamide, acetamide, chlorinated acetamides, etc.; ketones, e. g., methyl ethyl ketone, methyl vinyl ketone, acetone, etc.; aldehyde-reactable triazinyl compounds other than the triazine derivatives used in practicing the present invention, e. g., melamine, ammeline, ammelide, etc.; phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethylhexyl alcohol, ethylene glycol, propylene glycol, glycerine, polyvinyl alcohol, polyallyl alcohol, etc.; amines, including propyl amine, dibutyl amine, aniline, etc.; and others.

The modifying reactants may be incorporated with the aminotriazine and the aldehyde to form an intercondensation product by mixing all the reactants and effecting condensation therebetween under acid, alkaline or neutral conditions or by various permutations of reactants. For example, I may effect partial reaction or condensation between the chosen aldehyde and the aminotriazine, then add the modifying reactant, e. g., urea, melamine, etc., and effect further condensation. Or, I may first partially react urea, melamine or other aldehyde-reactable modifying reactant with a molecular excess of an aldehyde under acid, alkaline or neutral conditions, then add the aminotriazine, and effect further condensation. Or, I may separately partially react (1) urea, melamine or other aldehyde-reactable modifying reactant and an aldehyde and (2) an aminotriazine of the kind herein described and an aldehyde, thereafter mixing the two products of partial reaction and effecting further reaction or condensation therebetween. The reactants of (1) and (2) initially may be partially condensed under acid, alkaline or neutral conditions.

Some of the aminotriazine-aldehyde reaction products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins that have unsatisfactory physical characteristics. The thermosetting or potentially thermosetting resinous condensation products, alone or mixed with fillers, pigments, dyes, plasticizers, lubricants, curing agents, etc., may be used, for example, in the production of molding compositions. The liquid intermediate condensation products of this invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. Thus, as has been indicated hereinbefore, they are particularly useful and valuable, because of their cationic nature, as compositions (or as components of compositions) for the treatment of cellulosic and non-cellulosic textiles (e. g., cotton, linen, rayons, silk, wool, Orlon, Dacron, nylon, Vicara, Acrilan, etc.) in continuous filament, thread, staple, yarn, fabric (knitted, woven, felted, etc.) or other form, in order to improve the properties of such textile materials, e. g., to increase the stiffness, to increase the service life, to provide antistatic properties, or otherwise to enhance the properties of the treated materials and to make them more useful or serviceable to the ultimate user.

The curing of the thermosetting or potentially thermosetting resinous compositions of this invention may be accelerated by incorporating therein a curing agent (or mixture of curing agents), for instance, a direct or active curing catalyst (e. g., phthalic acid, phthalic anhydride, maleic acid, maleic anhydride, succinic acid, tartaric acid, citric acid, etc.), or a latent curing catalyst (e. g., an ammonium salt of phosphoric acid, ammonium chloride, ammonium silicofluoride, ammonium borofluoride, benzoyl mercaptobenzothiazole, ammonium salt of toluene sulfonic acid, phthaloyl mercaptobenzothiazole, benzoyl phthalimide, etc.). Catalysts which are capable of intercondensing with the partial reaction product may be employed, for instance, curing reactants such as glycine, sulfamic acid, chloroacetone, mono-, di- or trichloroacetamides, chloroacetyl urea, etc. The amount of curing agent, if used, may be varied as desired or as conditions may require, but ordinarily is within the range of 0.1 to 5 or 6 percent by weight of the neutral, thermosetting or potentially thermosetting resinous composition.

As indicated hereinbefore, the properties of the fundamental aminotriazine-aldehyde reaction products of this invention may be varied widely by introducing other modifying bodies before, during or after effecting condensation between the primary components. Thus as modifying agents I may use, for instance, monohydric alcohols, e. g., methyl, ethyl, propyl, butyl, hexyl, n-octyl, 2-ethylhexyl, decyl, dodecyl, cetyl, lauryl, capryl, or tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, trimethylol propane, mannitol, sorbitol, ethylene glycol, diethylene glycol, butylene glycol, neopentyl glycol, 2-butene-1,4-diol, 2-butyne-1,4-diol, 2-butyl-octanediol-1,3, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., stearamide, acrylamide, methacrylamide, benzamide, phthalamide, benzene sulfonamides, toluene sulfonamides, etc.; amines, e. g., ethylene diamine, phenylene diamine, triethylene tetramine, etc.; nitriles, including halogenated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetylurea, etc.

Illustrative examples of other modifying bodies that may be incorporated into the aminotriazine-aldehyde reaction products of this invention are melamine-aldehyde condensation products (e. g., melamine-formaldehyde condensation products), urea-aldehyde condensation products (e. g., urea-formaldehyde condensation products), protein-aldehyde condensation products, aminodiazine-aldehyde condensation products, aminotriazolealdehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, urea-melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

In the preparation of the coating compositions of this invention I prefer to interact (1) a triazine derivative of the kind embraced by Formula V, (2) an aldehyde, specifically formaldehyde, and (3) a monohydric alcohol, more particularly a primary monohydric alcohol. An alkylation reaction takes place, and an ether corresponding to the alkyl radical of the alcohol employed is formed. In such reactions I prefer to use n-butanol, but other primary monohydric alcohols may be employed, e. g., methanol, ethanol, n-propyl alcohol, isobutyl alcohol, etc.

Dyes, pigments, driers, curing agents, plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the resinous materials of my invention, as desired or as conditions may require, in order to provide a coating, molding or other composition best adapted to meet a particular service use. For additional and more detailed information concerning the modifying ingredients that may be employed in producing coating compositions from my new resins, reference is made to the aforementioned Moore patent.

The modified and unmodified resinous compositions of this invention have a wide variety of uses. For example, in addition to their use in the production of coating and molding compositions, they may be employed as modifiers of other natural and synthetic resins. Thus, the thermoplastic resins may be used to improve the plasticity or flow characteristics of thermosetting resins which have insufficient or unsatisfactory plasticity during curing to an insoluble, infusible state, e. g., certain urea-formaldehyde and melamine-formaldehyde resins where better flow during molding is desirable. This improved plasticity permits molding at lower pressures. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass cloth, fabrics comprised of nylon, polyacrylonitrile fibers, etc., are coated or coated and impregnated with the resin solution, superimposed and thereafter united under heat and pressure. They also may be employed as an adhesive in making laminated plywood, as an impregnant of pulp preforms from which molded articles thereafter are made by subjecting the impregnated preform to heat and pressure, for bonding together abrasive grains in the production of resin-bonded abrasive articles such, for instance, as grindstones, sandpapers, etc., for treating leather in order to improve its appearance and physical properties, and for numerous other purposes.

I claim:

1. A composition comprising a reaction product of ingredients comprising (1) a 1,3,5-triazine containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals, (2) a halohydrin, and (3) a monoalkanol amine, the ingredients of (1) and (3) being employed in a molar ratio of from 0.5 to 3 moles of the latter for each mole of the former, and the ingredient of (2) being employed in a molar ratio at least equal to that of the ingredient of (3).

2. A composition as in claim 1 wherein the 1,3,5-triazine of (1) is melamine.

3. A composition as in claim 1 wherein the halohydrin of (2) is ethylene chlorohydrin.

4. A composition as in claim 1 wherein the monoalkanol amine of (3) is monoethanol amine.

5. A composition comprising a reaction product of ingredients comprising (1) melamine, (2) ethylene chlorohydrin, and (3) monoethanol amine, the ingredients of (1) and (3) being employed in a molar ratio of from 1 to 3 moles of the latter per mole of the former, and the ethylene chlorohydrin being employed in a molar ratio of from 1 to 2 moles thereof for each mole of monoethanol amine.

6. A composition comprising a reaction product of ingredients comprising (1) an aldehyde and (2) a reaction product of ingredients comprising (a) a 1,3,5-triazine containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals, (b) a halohydrin, and (c) a monoalkanol amine, the ingredients of (a) and (c) being employed in a molar ratio of from 0.5 to 3 moles of the latter for each mole of the former, and the ingredient of (b) being employed in a molar ratio at least equal to that of the ingredient of (b).

7. A composition as in claim 6 wherein the aldehyde of (1) is formaldehyde.

8. A composition comprising a reaction product of ingredients comprising (1) formaldehyde and (2) a reaction product of ingredients comprising (a) melamine, (b) ethylene chlorohydrin, and (c) monoethanol amine, the ingredients of (a) and (c) being employed in a molar ratio of from 1 to 3 moles of the latter per mole of the former, and the ethylene chlorohydrin being employed in a molar ratio of from 1 to 2 moles thereof for each mole of monoethanol amine.

9. The method of preparing a new synthetic composition which comprises effecting reaction under heat between ingredients comprising (1) a 1,3,5-triazine containing at least two aldehyde-reactable amino groups, said triazine having attached to one carbon atom of the triazine nucleus a grouping which contains an —$NH_2$ radical and having attached to another carbon atom of the triazine nucleus a grouping which contains an —NHR radical, where R represents a member of the class consisting of hydrogen and monovalent hydrocarbon radicals, (2) a halohydrin, and (3) a monoalkanol amine, the ingredients of (1) and (3) being employed in a molar ratio of from 0.5 to 3 moles of the latter for each mole of the former, and the ingredient of (2) being employed in a molar ratio at least equal to that of the ingredient of (3).

No references cited.